Figure 1:
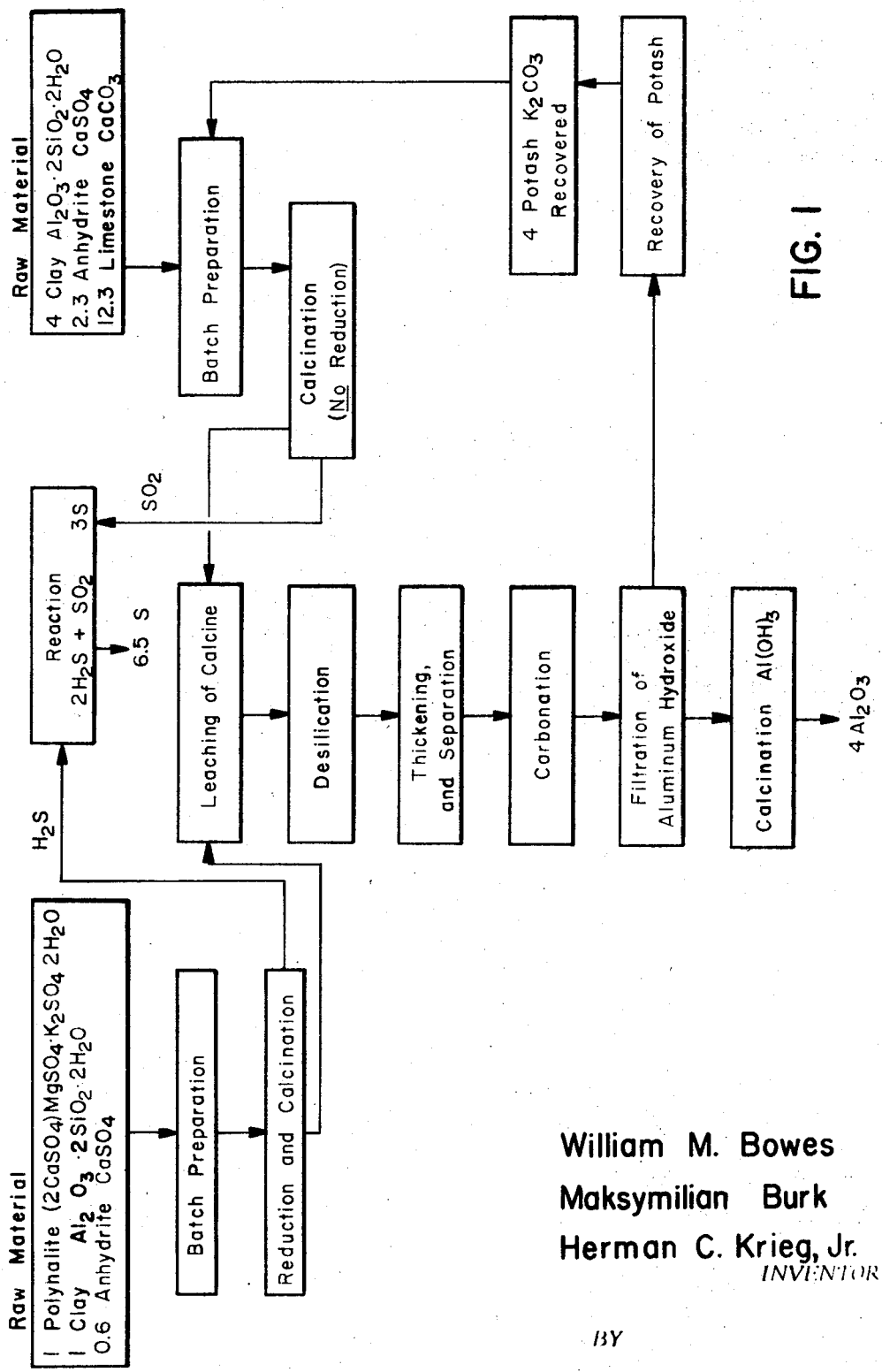

United States Patent
Burk et al.

[15] 3,652,208
[45] Mar. 28, 1972

[54] ALUMINA EXTRACTION FROM ALUMINO-SILICATE ORES AND POTASSIUM SULFATE ORES

[72] Inventors: Maksymilian Burk, Los Angeles; William M. Bowes, Palos Verdes Estates; Herman C. Krieg, Jr., Palos Verdes Peninsula, all of Calif.

[73] Assignee: TRW Inc., Redondo Beach, Calif.

[22] Filed: May 4, 1970

[21] Appl. No.: 34,478

[52] U.S. Cl. .................................23/143, 23/37, 25/52
[51] Int. Cl. .................................................C01f 7/12
[58] Field of Search ....................................23/52, 143, 37

[56] References Cited

UNITED STATES PATENTS

| | | | |
|---|---|---|---|
| 298,256 | 5/1884 | Townsend | 23/37 |
| 1,680,066 | 8/1928 | Roth et al. | 23/52 |
| 2,176,444 | 10/1939 | Zirngibl | 23/52 |
| 2,347,736 | 5/1944 | Fisher | 23/52 |
| 2,141,132 | 12/1938 | Folger | 23/52 X |

*Primary Examiner*—Earl C. Thomas
*Assistant Examiner*—G. O. Peters
*Attorney*—Daniel T. Anderson, James V. Tura and Alan D. Akers

[57] ABSTRACT

Alumino-silicate ore and a potassium sulfate bearing ore such as polyhalite or langbeinite are reacted by reducing and then calcining. Reduction decomposes the reactants and produces $H_2S$. Calcining produces a sinter containing potassium aluminate and silicates. The aluminate is leached from the sinter with KOH and/or $K_2CO_3$ solution and then precipitated to $Al(OH)_3$ with $SO_2$ or $CO_2$. Subsequent calcining yields alumina; some of the potassium carbonate or sulfite is recycled back into the system and the balance is converted to potassium salts such as potassium sulfate or potash.

9 Claims, 2 Drawing Figures

FIG. I

William M. Bowes
Maksymilian Burk
Herman C. Krieg, Jr.
INVENTORS

ALUMINA EXTRACTION FROM ALUMINO-SILICATE ORES AND POTASSIUM SULFATE ORES

BACKGROUND OF THE INVENTION

This invention relates to a new and improved process for the extraction of alumina from alumino-silicate ores, for example a kaolin type clay. More particularly, this invention relates to the reaction between kaolin clay and polyhalite or langbeinite to yield alumina, hydrogen sulfide, $SO_2$ and salts of potassium such as a carbonate, sulfite, metabisulfite, sulfate, etc. Schoenite is also suitable.

The principal, if not the sole source, of alumina is obtained by extraction from bauxite ores. Although it is technically feasible to extract the alumina from the alumino-silicates such as clays or anorthosite, these processes are not competitive to those employing bauxite ores. Generally, the use of raw materials having a low alumina content requires a higher operational cost for the extraction process. Furthermore, many of the processes employed to extract alumina from kaolin clay require the use of large quantities of expensive reagents. Very few, if any, processes provide bisulfite, which can compensate for the high operational cost involved in extracting the alumina from the low grade ores.

Another problem involved in the extraction of alumina from alumino-silicate ores arises from the production of large amounts of unusable materials which must be disposed of nevertheless.

Processes for extracting alumina from alumino-silicates using soda ash and limestone have been proposed by the U.S. Bureau of Mines in: "Methods for Producing Alumina from Anorthosite, An Evaluation of a Lime-Soda Sinter Process," by Johnson, P. W. J., Peters, F. A., BuMines RI 7069(1968); and "Recovery of Alumina from Anorthosite, San Gabriel Mountains, California, Using the Lime Soda Sinter Process" Lundquist, BuMines RI 6288(1963). However the soda ash required is expensive, and so are the operating costs of the process as a whole.

It is, therefore, an object of the invention to provide an economical process for the extraction of alumina from alumino-silicate materials such as clays or anorthosite.

Another object of this invention is to provide a process for reacting an alumino-silicate with an ore of an alkali sulfate and an alkali earth sulfate to obtain an extractable alumina compound as the principal product and $SO_2$, $H_2S$ or S and various potassium salts as co-products of the reaction.

Another object of this invention is to provide a process for reacting kaolin clay with a polyhalite or langbeinite to thereby obtain an extractable alumina compound as the principal product and $SO_2$, $H_2S$ or S and various potassium salts as co-products of the reaction.

anorthosite or a kaolin clay and a potassium bearing ore such as polyhalite or langbeinite are reacted in two stages at high temperatures to yield a sinter and produce a gaseous sulfur compound. The first stage is a reduction at about 850° to about 950° C. preferably in a water-gas atmosphere. This causes the kaolin to decompose into alumina and silica; the sulfates in the polyhalite and langbeinite, and particularly the $K_2SO_4$, are decomposed in the reducing atmosphere and are converted to $SO_3$, $SO_2$ and $H_2S$.

The second stage involves a calcination reaction at temperatures of about 1,000°–1250° C. and is performed preferably in an oxidizing atmosphere. During calcination, the silica of the kaolin reacts with the calcium and magnesium oxides from the polyhalite or langbeinite to form calcium and magnesium silicates; the alumina will combine predominantly with the $K_2O$ to form a potassium aluminate The alkali earth silicates and potassium aluminate form a sinter from which potassium aluminate is leached out using a KOH and/or $K_2CO_3$ solution. The potassium aluminate solution is then reacted with $CO_2$ or $SO_2$ to precipitate aluminum hydroxide and form $K_2CO_3$ or $K_2SO_3$ in solution. The aluminum hydroxide is calcined to yield alumina, while the solution containing the potassium salts may be recycled, concentrated, or converted into potassium salts.

Calcium sulfate ores such as gypsum or anhydrite and calcium carbonate ores such as limestone may be employed to augment the calcium values for the reaction.

The process shown in FIG. 1 yields alumina and sulfur, while the entire potassium carbonate is recycled. The process shown in FIG. 2 yields alumina, free sulfur, and potassium sulfate or sulfite.

PRODUCTION OF ALUMINA, $H_2S$, $SO_2$ AND SULFUR

The embodiment of the invention shown in the flow chart of FIG. 1 is applicable to the case where the potash market does not warrant economic recovery. Anhydrite or gypsum and limestone are used to react with the kaolin silica while the kaolin alumina is reacted with recycled potassium carbonate. A sinter containing predominantly potassium aluminate and calcium and magnesium silicates is formed from which alumina is eventually produced. $H_2S$, $SO_2$ and sulfur are recovered from the reaction as co-products.

A first batch of washed polyhalite, beneficiated clay and anhydrite is blended together as shown in FIG. 1. The polyhalite is washed, if necessary, to reduce the sodium chloride concentration to a suitable value. Usually the kaolin clay will be associated with a certain amount of silica in the form if sand; the clay may be beneficiated by separation from the sand in a settling tank.

After being blended, the mixture of polyhalite and kaolin is then reduced in an atmosphere of a water gas at about 850°–950° C. The equation for the reactions are as follows:

Generation of Water Gas $$CH_4 + H_2O \rightarrow CO + 3H_2$$
$$CH_4 + 2H_2O \rightarrow CO_2 + 4H_2$$

Decomposition of Raw Materials $$(2\,SiO_2) \cdot Al_2O_3 \cdot 2H_2O \rightarrow 2\,SiO_2 + Al_2O_3 + 2H_2O \uparrow$$

(kaolin clay)

$$CaCO_3 \rightarrow CaO + CO_2 \uparrow$$

(limestone)

$$(2CaSO_4) \cdot MgSO_4 \cdot K_2SO_4 \cdot 2H_2O \rightarrow 2CaSO_4 + MgSO_4 + K_2SO_4 + 2H_2O$$

(polyhalite)

Reduction of Polyhalite Sulfates $$CaSO_4 + 4H_2 \rightarrow CaS + 4H_2O \uparrow$$
$$CaS + H_2O \rightarrow CaO + H_2S \uparrow$$
$$K_2SO_4 + 4H_2 \rightarrow K_2S + 4H_2O \uparrow$$
$$K_2S + H_2O \rightarrow K_2O + H_2S \uparrow$$
$$MgSO_4 \rightarrow MgO + SO_2 \uparrow + \tfrac{1}{2} O_2 \uparrow$$
$$SO_2 + 3H_2 \rightarrow H_2S \uparrow + 2H_2O \uparrow$$

The reduction stage is accompanied and followed by a sintering reaction between the oxides which have just formed. The sintering reaction is performed preferably in an air atmosphere at about 1,000°–1250° C. using combustion gases to provide the heat. Thereby silica is combined predominantly with calcia or magnesia, and alumina reacts with potash to produce a sinter containing the following:

2CaO + $SiO_2$ → $Ca_2SiO_4$ (calcium orthosilicate)
CaO + $SiO_2$ → $CaSiO_3$ (calcium metasilicate)
2MgO + $SiO_2$ → $Mg_2SiO_4$ (magnesium orthosilicate)
MgO + $SiO_2$ → $MgSiO_3$ (magnesium metasilicate)
2CaO + MgO + $2SiO_2$ → $(2CaO) \cdot MgO \cdot 2SiO_2$ (akermanite)
$Al_2O_3$ $K_2O$ → $K_2O \cdot Al_2O_3$ (potassium aluminate)

The sinter containing the potassium aluminate is then forwarded to a leaching operation.

Carbon dioxide contained in the flue gas is forwarded to a subsequent carbonation reactor.

$H_2S$ obtained from the reaction of the polyhalite and clay may be reacted with $SO_2$ from the calcination of the clay, anhydrite, and limestone; this will produce sulfur. Instead of reacting the $H_2S$ and sulfur dioxide, they may be employed for separate purposes; for example, the $SO_2$ may be converted to $H_2SO_4$.

In a second batch, clay is blended with anhydrite and limestone and recycled $K_2CO_3$. The batch is then calcined without reduction to produce $SO_2$ and a sinter of potassium aluminate and silicates; this sinter is also forwarded to the leach operation along with the sinter from the first batch.

In the leaching operation, the sinter containing potassium aluminate which has been produced in both calcination steps of the first and second batches, is leached with a KOH and/or potassium carbonate solution. The potassium aluminate is dissolved out of the sinter leaving behind the insoluble calcium and magnesium silicates. The insoluble silicates are discarded as tailings, and the soluble portion containing the extracted potassium aluminate is forwarded to a desilication step.

In the desilication operation, which is performed only if necessary, lime is employed to remove silicates which are present in the solution of potassium aluminate.

Following desilication, the potassium aluminate solution is forwarded to a thickener tank. Underflow from the thickener which contains residue from the desilication step and also tailings from the leaching and washing operation are removed; the overflow containing potassium aluminate in solution is then forwarded to a carbonation step.

In the carbonation operation, carbon dioxide obtained from the flue gas, and which has been cooled, purified and washed, is reacted with the potassium aluminate solution. This causes aluminum hydroxide to precipitate and forms potassium carbonate in solution according to the following reaction:

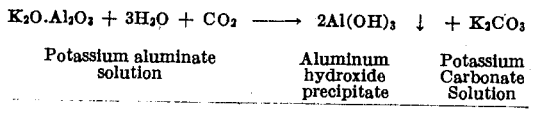

| $K_2O \cdot Al_2O_3$ + $3H_2O$ + $CO_2$ | $\longrightarrow$ | $2Al(OH)_3 \downarrow$ | + $K_2CO_3$ |
|---|---|---|---|
| Potassium aluminate solution | | Aluminum hydroxide precipitate | Potassium Carbonate Solution |

The precipitation rate of aluminum hydroxide may be promoted by seeding with recycled aluminum hydroxide.

The potassium carbonate solution is separated from the aluminum hydroxide precipitate in a classifier and thickener. The overflow solution of potassium carbonate is filtered and recycled to the batch preparation step as shown in FIG. 1. Preferably the potassium carbonate solution is partly or wholly evaporated and crystallized. Retained aluminum hydroxide is washed and forwarded for calcination.

The aluminum hydroxide from the classifier and thickener is filter washed to form a filter keg; the potassium carbonate filter from the filter keg, may be evaporated, crystallized and then recycled to the batch preparation step along with the overflow from the classifier and thickener.

The filter keg after drying may be employed directly as aluminum hydroxide or it may be calcined to gamma alumina, alpha alumina, or active alumina depending on requirements.

It will be apparent that this particular embodiment of the invention as shown in FIG. 1 enables maximum use to be made of the components in the polyhalite, kaolin, gypsum and anhydrite. Aluminum hydroxide and various forms of alumina are produced as the principal products, while $H_2S$, $SO_2$ and sulfur are recovered in sufficient quantities from the process to make it economically viable. The nature of the process also permits utilization in the carbonation step of carbon dioxide from the off-gas. Also, the process is independent of an external supply of alkalis and this represents a marked advantage over the Bayer process.

PRODUCTION OF ALUMINA, SULFUR AND POTASSIUM SULFATE

Figure 2:
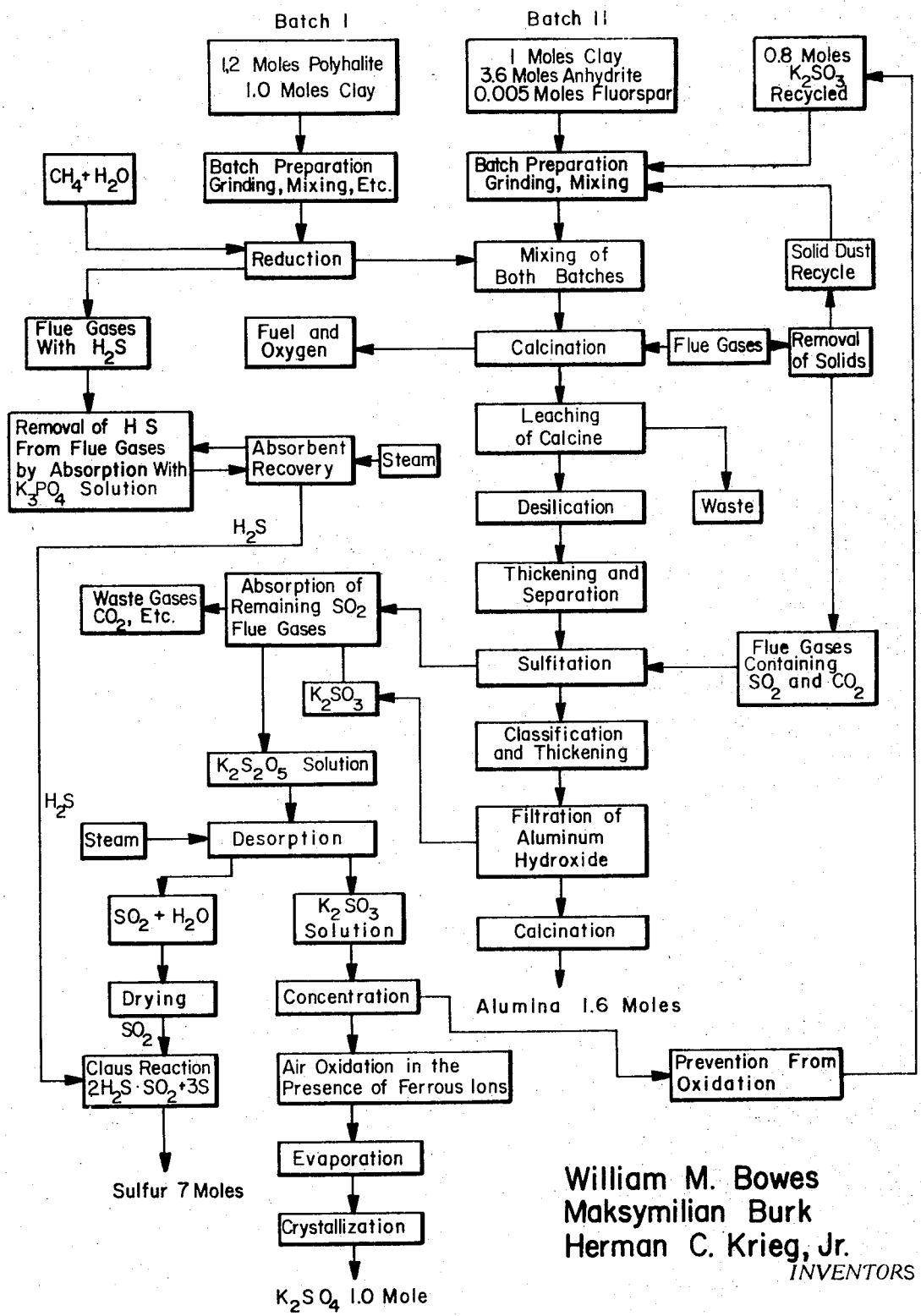

In the embodiment of the invention shown in the flow diagram of FIG. 2, a first batch of washed polyhalite and beneficiated clay is blended, ground and then reduced in an atmosphere containing methane and water (water-gas) to produce $H_2S$ and a sinter of potassium aluminate and alkali earth silicates. $H_2S$ produced from the reduction may be extracted such as by absorption with $K_3PO_4$ solution and subsequently reacted with $SO_2$ to produce sulfur. A second batch of clay, anhydrite, and fluorspar (for fluxing) are similarly prepared and mixed with recycled potassium sulfite. The solid reaction product of clay and polyhalite is batched with the blend of preferably clay and anhydrite and recycled potassium sulfite and then calcined using a thermal source preferably of fuel and oxygen; this produces a sinter of potassium aluminate and alkali earth silicates. Flue gases from the calcination reaction are separated from the solid dust particles, the latter being recycled back into the batch preparation step. The dust-free flue gases containing sulfur dioxide and carbon dioxide are forwarded to a subsequent sulfitation stage.

Following the calcination operation, production of aluminum hydroxide proceeds somewhat similarly to the process in FIG. 1. This involves: leaching of the sinter with KOH and/or $K_2CO_3$ solution; desilication in autoclaves if necessary with lime; separation of the potassium aluminate solution from the calcium silicate in a thickening and separation tank; and forwarding the liquid overflow of potassium aluminate to a sulfitation operation where flue gases containing sulfur dioxide and carbon dioxide from the calcination step are reacted with the potassium aluminate to precipitate aluminum hydroxide and produce a potassium sulfite solution. From the sulfitation step, the aluminum hydroxide is rake classified and thickened; the potassium sulfite overflow is filtered and the filtrate is subsequently utilized for regaining excess sulfur dioxide, and production of potassium sulfate. Aluminum hydroxide from the thickening operation and the filter keg from the potassium sulfite filtration are both washed and the filter washes are combined with the potassium sulfite solution. The washed aluminum hydroxide is then dried and may be calcined to form alumina.

The potassium sulfite solution, which has been filtered from the aluminum hydroxide, may be used to absorb excess sulfur dioxide from the sulfitation step. This will produce a potassium metabisulfite solution which is desorbed with steam to regenerate a potassium sulfite solution, and a sulfur dioxide-water vapor phase. Water is removed from this phase in a drying operation, and the $SO_2$ which remains may be combined with $H_2S$ from the reduction step in a Clause reaction to produce sulfur. Obviously, the $SO_2$ may be converted to $H_2SO_4$ rather than sulfur depending on plant economics.

The potassium sulfite solution from the desorption step is concentrated and recycled to the batch preparation step. The remainder of the potassium sulfite solution is then oxidized for example in the presence of ferrous ions and finally evaporated and crystallized to potassium sulfate.

It will be appreciated that the mineral raw materials employed in the process mutually supplement each other and no additional raw materials, such as acids, soda, sodium sulfate, etc., are necessary for the extraction of alumina from the alumino-silicates. Furthermore, the process is quite versatile since alumina values may be obtained in various forms such as aluminum hydroxide, gamma alumina, alpha alumina, and active alumina. The sulfur may be obtained as free sulfur, sulfur dioxide, and hydrogen sulfide. The potassium salts may be recovered in the forms of sulfate, sulfite, bisulfite, sulfide, carbonate, bicarbonate, and chloride. Overall, therefore, this permits a flexibility which can adjust to the actual product and market conditions thereby optimizing the return on investment.

Finally, the co-products $H_2S$, $SO_2$ sulfur and potassium salts are sufficiently valuable to compensate, and even produce a profit, despite the increased costs inherent in extracting alumina from low grade ore.

What is claimed is:

1. A process for recovering alumina values from alumino-silicate ores which comprises:
    reducing a first batch of an alumino-silicate ore and a potassium sulfate ore to form a reduced ore and $H_2S$;
    calcining said reduced ore to form a first sinter;

calcining a second batch containing an alumino-silicate ore, a calcium containing ore and potash or potassium sulfate to form a second sinter and $SO_2$;

leaching said first and second sinters together to extract a solution of potassium aluminate therefrom;

precipitating aluminum hydroxide from the potassium aluminate solution;

recovering alumina values from the aluminum hydroxide; and recycling the solution remaining from the precipitation reaction to the second batch prior to the calcining step.

2. The process of claim 1 in which the alumino-silicate is a kaolin clay.

3. The process of claim 1 in which the potassium sulfate bearing ore is selected from the class consisting of polyhalite, langbeinite, and schoenite.

4. The process of claim 1 in which additional calcium for the reaction is supplied by a compound selected from the class consisting of: gypsum, anhydrite and limestone.

5. The process of claim 1 in which the reduction is carried out at a temperature of about 850°–950° C.

6. The process of claim 5 in which the reduction is carried out in an atmosphere containing water-gas and methane.

7. The process of claim 1 in which the calcination of said first batch is carried out at temperatures of about 1,000°–1250 °C.

8. The process of claim 1 in which the calcination of said first batch is carried out in an air atmosphere.

9. The process of claim 1 in which the aluminum hydroxide is precipitated with a member of the group consisting of $SO_2$ and $CO_2$.

* * * * *

UNITED STATES PATENT OFFICE
CERTIFICATE OF CORRECTION

Patent No. 3,652,208    Dated March 28, 1972

Inventor(s) Maksymilian Burk, William M. Bowes & Herman C. Krieg, Jr.

It is certified that error appears in the above-identified patent and that said Letters Patent are hereby corrected as shown below:

Col. 1, line 22:  After "provide" delete "bisulfite" and add --by-products--.

Col. 1, line 51:  Add the following which was omitted:

--THE INVENTION

According to the invention, an aluminosilicate ore such as--

Signed and sealed this 26th day of September 1972.

(SEAL)
Attest:

EDWARD M. FLETCHER, JR.
Attesting Officer

ROBERT GOTTSCHALK
Commissioner of Patents